(12) United States Patent
Barber et al.

(10) Patent No.: US 12,444,335 B2
(45) Date of Patent: Oct. 14, 2025

(54) CALIBRATION OF A COLOR DISPLAY DEVICE

(71) Applicant: Datacolor, Inc., Lawrenceville, NJ (US)

(72) Inventors: Heath Barber, Fuquay Varina, NC (US); Kostenko Yevhen Andriyovych, Kharkov (UA); Hong Wei, Princeton, NJ (US)

(73) Assignee: Datacolor, Inc., Lawrenceville, NJ (US)

( * ) Notice: Subject to any disclaimer, the term of this patent is extended or adjusted under 35 U.S.C. 154(b) by 286 days.

(21) Appl. No.: 18/193,592

(22) Filed: Mar. 30, 2023

(65) Prior Publication Data
US 2024/0331604 A1    Oct. 3, 2024

(51) Int. Cl.
*G09G 3/20*    (2006.01)
*G06T 7/33*    (2017.01)
(Continued)

(52) U.S. Cl.
CPC ............ *G09G 3/2003* (2013.01); *G06T 7/33* (2017.01); *G06T 7/73* (2017.01); *G06T 7/90* (2017.01); *H04N 23/61* (2023.01); *H04N 23/635* (2023.01); *H04N 23/64* (2023.01); *G06T 2207/10024* (2013.01); *G06T 2207/30204* (2013.01); *G06T 2207/30244* (2013.01); *G09G 2320/0693* (2013.01)

(58) Field of Classification Search
CPC . G06T 2207/10024; G06T 2207/30204; G06T 2207/30244; G06T 7/73; G06T 7/33; G06T 7/90; G06T 2200/24; G09G 3/2003; G09G 2320/0693; H04N 1/6058; H04N 1/6019; H04N 1/6023; H04N 23/61–64; H04N 23/635; H04N 23/10
See application file for complete search history.

(56) References Cited

U.S. PATENT DOCUMENTS 10,719,953 B1 *   7/2020   Ye ........................... G06T 7/246
11,470,293 B2   10/2022   Park et al.
(Continued)

FOREIGN PATENT DOCUMENTS

WO        2015167984 A1    11/2015

OTHER PUBLICATIONS

TruHu, Monitor Color Calibration App, Seboya, 2024, https://truhu.app/product, printed on May 17, 2024, 4 pages.

*Primary Examiner* — Wesner Sajous

(57) ABSTRACT

A method includes controlling an integrated camera of a mobile device to detect a plurality of fiducial markers displayed as part of a test pattern on a display surface of a color display device, wherein the test pattern is one of a plurality of test patterns, estimating a position of the integrated camera relative to the display surface, using the plurality of fiducial markers, augmenting a live image of the test pattern on a display of the mobile device with an overlay, controlling, in response to a position of the overlay being aligned on the display of the mobile device with the live image of the test pattern, the integrated camera to capture an image of the test pattern, and calculating an adjustment to a color setting of the color display device, wherein the adjustment is calculated using information extracted from the image.

20 Claims, 6 Drawing Sheets

(51) Int. Cl.
*G06T 7/73* (2017.01)
*G06T 7/90* (2017.01)
*H04N 23/60* (2023.01)
*H04N 23/61* (2023.01)
*H04N 23/63* (2023.01)

(56) References Cited

U.S. PATENT DOCUMENTS

| | | | |
|---|---|---|---|
| 2016/0165225 A1* | 6/2016 | Djurdjevic | H04N 21/442 |
| | | | 348/187 |
| 2018/0342050 A1* | 11/2018 | Fitzgerald | G06T 7/0002 |
| 2020/0090412 A1* | 3/2020 | Harviainen | G06T 19/006 |
| 2021/0116392 A1* | 4/2021 | Fitzgerald | G06K 7/1417 |
| 2021/0382736 A1 | 12/2021 | Sanders et al. | |
| 2024/0233187 A1* | 7/2024 | Spiker | H04N 23/10 |
| 2025/0017689 A1* | 1/2025 | Lang | A61B 90/96 |

\* cited by examiner

CALIBRATION OF A COLOR DISPLAY DEVICE

FIELD OF THE DISCLOSURE

The present disclosure generally relates to the display of color, and more specifically relates to the calibration of a color display device using a mobile device such as a smart phone or tablet computer.

BACKGROUND

Color display devices, such as televisions, computer monitors, smartphone and tablet computer displays, and the like, have color signatures that are unique to the individual devices. What this means is that each color display device will display a given color according to manufacturing tolerances and material deterioration (e.g., due to age, use, and the like). In order to adjust a color display device's input or output color response to a desired or target color response, a color calibration process may be employed. The color calibration process may use a color measurement instrument (e.g., a colorimeter or spectrophotometer) to measure, for each color of a plurality of colors, the difference between a corresponding target color and the actual color that is output by the color display device. When the color measurement instrument is a colorimeter, a calibration matrix may be used to convert raw measured values to tristimulus (XYZ) values. The XYZ values may then be used to create a color correction profile to adjust the colors output by the color display device. The adjustments to the colors may be applied to International Color Consortium (ICC) color profiles, three-dimensional lookup tables (LUTs) with color corrections, and manual instructions for display device adjustments (e.g., to contrast, brightness, color, tint, red/green/blue levels, or the like).

SUMMARY OF THE DISCLOSURE

In one example, a method performed by a processing system of a mobile device includes controlling an integrated camera of the mobile device to detect a plurality of fiducial markers that is displayed as part of a test pattern displayed on a display surface of a color display device to be calibrated, wherein the test pattern is one of a plurality of test patterns, estimating a position of the integrated camera relative to the display surface, using the plurality of fiducial markers, augmenting a live image of the test pattern that is visible on a display of the mobile device with an overlay, controlling, in response to a position of the overlay being aligned on the display of the mobile device with the live image of the test pattern, the integrated camera to capture a two-dimensional image of the test pattern, and calculating an adjustment to a color setting of the color display device, wherein the adjustment is calculated based on information extracted from the two-dimensional image.

In another example, a non-transitory computer-readable medium stores instructions. When executed by a processing system of a mobile device, the instructions cause the processing system to perform operations. The operations include controlling an integrated camera of the mobile device to detect a plurality of fiducial markers that is displayed as part of a test pattern displayed on a display surface of a color display device to be calibrated, wherein the test pattern is one of a plurality of test patterns, estimating a position of the integrated camera relative to the display surface, using the plurality of fiducial markers, augmenting a live image of the test pattern that is visible on a display of the mobile device with an overlay, controlling, in response to a position of the overlay being aligned on the display of the mobile device with the live image of the test pattern, the integrated camera to capture a two-dimensional image of the test pattern, and calculating an adjustment to a color setting of the color display device, wherein the adjustment is calculated based on information extracted from the two-dimensional image.

In another example, a mobile device includes a processing system including at least one processor and a non-transitory computer-readable medium storing instructions. When executed by the processing system, the instructions cause the processing system to perform operations. The operations include controlling an integrated camera of the mobile device to detect a plurality of fiducial markers that is displayed as part of a test pattern displayed on a display surface of a color display device to be calibrated, wherein the test pattern is one of a plurality of test patterns, estimating a position of the integrated camera relative to the display surface, using the plurality of fiducial markers, augmenting a live image of the test pattern that is visible on a display of the mobile device with an overlay, controlling, in response to a position of the overlay being aligned on the display of the mobile device with the live image of the test pattern, the integrated camera to capture a two-dimensional image of the test pattern, and calculating an adjustment to a color setting of the color display device, wherein the adjustment is calculated based on information extracted from the two-dimensional image.

BRIEF DESCRIPTION OF THE DRAWINGS

The teachings of the present disclosure can be readily understood by considering the following detailed description in conjunction with the accompanying drawings, in which.

DETAILED DESCRIPTION

Figure 1:
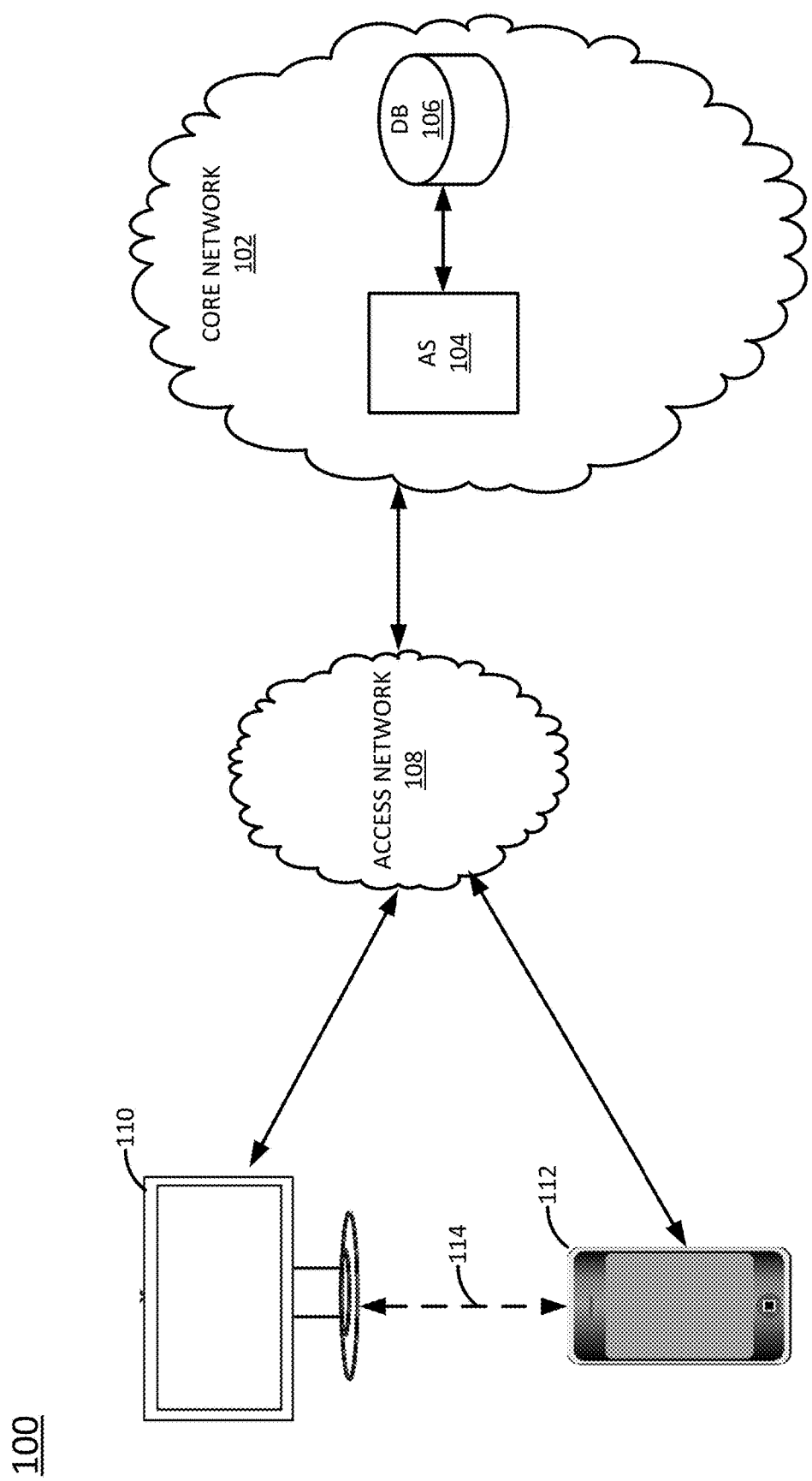
FIG. 1 illustrates an example system in which examples of the present disclosure of a calibration of a color display device using a mobile device such as a smart phone or tablet computer may operate.

In one example, the present disclosure includes a method, apparatus, and non-transitory computer-readable medium for calibration of a color display device using a mobile device such as a smart phone or tablet computer. As discussed above, color display devices, such as televisions, computer monitors, smartphone and tablet computer displays, and the like, have color signatures that are unique to the individual devices. What this means is that each color display device will display a given color according to manufacturing tolerances and material deterioration (e.g., due to age, use, and the like). In order to adjust a color display device's input or output color response to a desired or target color response, a color calibration process may be employed. The color calibration process may use a color measurement instrument (e.g., a colorimeter or spectrophotometer) to measure, for each color of a plurality of colors, the difference between a corresponding target color and the actual color that is output by the color display device. When the color measurement instrument is a colorimeter, a calibration matrix may be used to convert raw measured values measured by a color measurement instrument to tristimulus (XYZ) values. The XYZ values may then be used to create a color correction profile to adjust the colors output by the color display device. The adjustments to the colors may be applied to International Color Consortium (ICC) color profiles, three-dimensional lookup tables (LUTs) with color corrections, and manual instructions for display device adjustments (e.g., to contrast, brightness, color, tint, red/green/blue levels, or the like).

Conventionally, calibration of a color display device requires access to specialized equipment such as a specialized color measurement instrument. For instance, a colorimeter or spectrophotometer may be attached flush against a display surface of the color display device and shielded from ambient light. Calibration software (executing on the color measurement instrument, the color display device, or another computing device cooperating with the color measurement instrument and the color display device) may send a series of instructions to cause the color display device to display the target colors. The color measurement instrument may be used to measure the actual colors that are output by the color display device in response to these instructions. Although conventional calibration processes are very effective at producing desired color outputs, most individuals do not have regular access to the specialized color measurement instruments needed to properly calibrate color display devices.

Examples of the present disclosure calibrate a color display device using the camera of a mobile device, such as a smart phone or a tablet computer, to measure the actual colors output by the color display device. Thus, the mobile device effectively serves as a replacement for a more specialized color measurement instrument, such as a colorimeter or spectrophotometer. Examples of the present disclosure utilize test patterns comprising a plurality of known colors. The test patterns further include a plurality of fiducial markers (e.g., ArUco markers, or the like) of known size and position located around the borders of the test patterns. The color display device is instructed to display one or more of these known test patterns for measurement by the mobile device. Further examples of the present disclosure guide a user in positioning the mobile device relative to the color display device in order to obtain correct measurement of the colors output by the color display device. The positioning is a function of both the distance of the mobile device from the color display device's display surface and the angle of the mobile device's camera relative to the color display device's display surface. The positioning is guided using augmented reality technology to detect the fiducial markers in the test pattern, and using the fiducial markers to align the mobile device. These and other aspects of the present disclosure are discussed in more detail below with respect to FIGS. 1-6.

To further aid in understanding the present disclosure, FIG. 1 illustrates an example system 100 in which examples of the present disclosure calibration of a color display device using a mobile device such as a smart phone or tablet computer may operate. The system 100 may include one or more types of communication networks, including a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and providing communications services of a business, an educational institution, a governmental service, or other enterprises (also referred to as the/a "cloud").

The core network 102 may be in communication with one or more access networks, such as access network 108. The access network 108 may include a wireless access network (e.g., a WiFi network and the like), a mobile or cellular access network, a PSTN access network, a cable access network, a wired access network, or the like. The core network 102 and the access network 108 may be operated by different service providers, the same service provider, or a combination thereof.

In accordance with the present disclosure, the core network 102 may include an application server (AS) 104 and a database (DB) 106. The AS 104 may comprise a computing system or server, such as the computing system 600 depicted in FIG. 6, and may be configured to provide one or more operations or functions for calibration of a color display device, as described herein. For instance, the AS 104 may be configured to provide an identifier associated with data that is used to build an ICC profile for a color display device, as described in further detail below.

Figure 6:
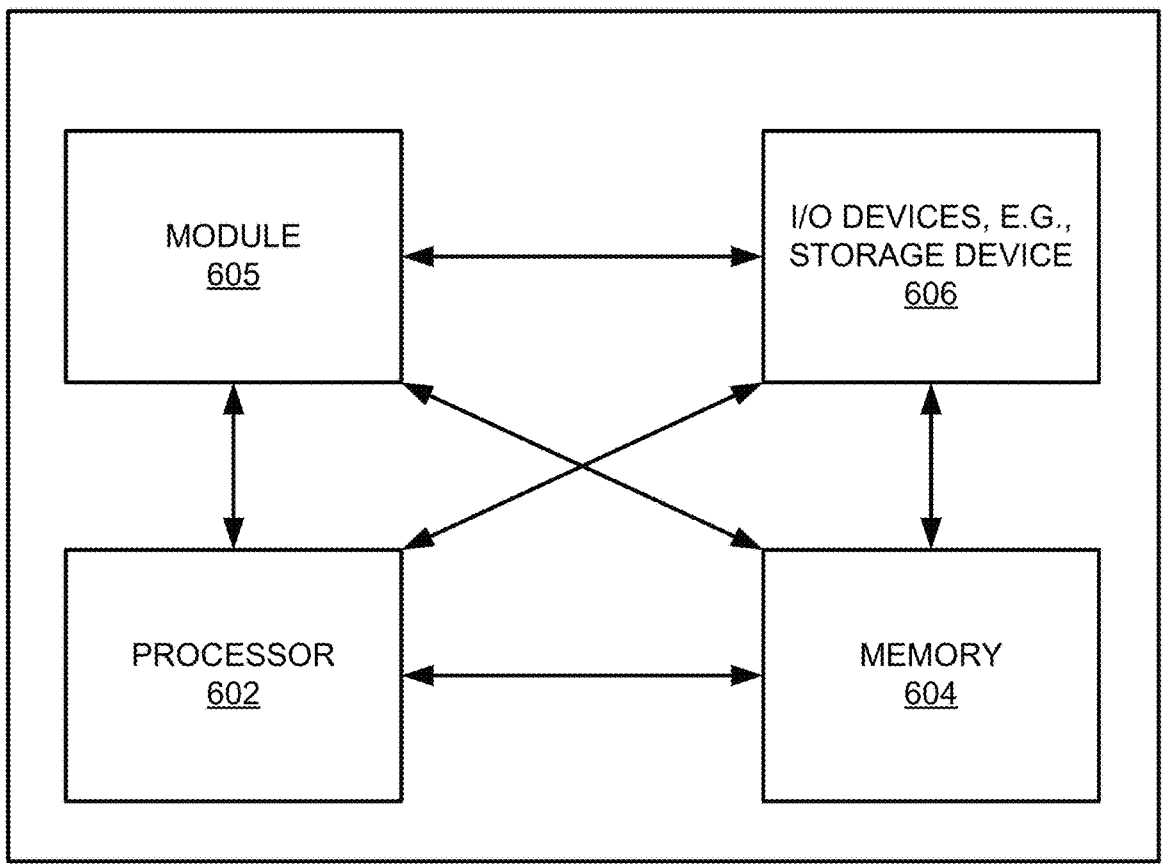
FIG. 6 is a high level block diagram of the calibration method that is implemented using a computing device specifically programmed to perform the steps, functions, blocks and/or operations described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure.

The AS 104 may be communicatively coupled to a database (DB) 106. The DB 106 may store identifiers that the AS 104 retrieves and provides to mobile devices being used to calibrate color display devices, as described herein. For instance, the DB 106 may store identifiers associated with binary large objects (BLOBs).

Although only a single application server (AS) 104 and a single database (DB) 106 are illustrated in FIG. 1, it should be noted that any number of servers and databases may be deployed. For instance, a plurality of servers and databases may operate in a distributed and/or coordinated manner as a processing system to perform operations for calibration of a color display device, in accordance with the present disclosure. For ease of illustration, various additional elements of network 102 are omitted from FIG. 1.

In one example, the access network 108 may be in communication with one or more user endpoint devices, such as a color display device 110 and a mobile device 112. In one example, the color display device 110 may comprise any electronic device that includes a display that is capable of producing a color output. For instance, the color display device 110 may be a television, a computing system including a monitor, a tablet computer, a mobile phone, a laptop computer, a virtual reality headset, a gaming device, or the like. In one example, the mobile device 112 may be any type of mobile endpoint devices, such as a cellular telephone, a smart phone, a tablet computer, a laptop computer, a netbook, an ultrabook, a portable media device (e.g., an electronic reading device), a portable gaming device, a digital media player, and the like, or even a wearable device such as a smart watch. The mobile device 112 may be configured as a computer similar to that illustrated in FIG. 6 and described in greater detail below. In one example, the mobile device 112 includes an integrated (digital) camera. The integrated camera may be a camera that is built into the mobile device 112, e.g., as opposed to being part of another system that can be attached to the mobile device 112. In other words, the integrated camera may not be separable from the mobile device 112 without disassembling the mobile device 112 (e.g., components of the integrated camera may reside on the motherboard of the mobile device).

In one example, the integrated camera is a red, green, blue (RGB) camera comprising a two-dimensional array of photosensors and an array of red, green, and blue color filters deposited over the photosensors. The color filters may be arranged in a "Bayer" pattern, i.e., such that each photosensor is covered by one color filter, and such that fifty percent of the color filters are green, twenty-five percent of the color filters are red, and twenty-five percent of the color filters are blue. The larger number of green color filters in the Bayer pattern reflects the fact that the human eye is more sensitive to green light than to red light or blue light.

When a broadband visible light (which contains red, green, and blue light) is incident on the integrated camera's array of photosensors, the broadband visible light may be filtered by the color filters prior to being collected by the photosensors. That is, the color filters will allow the corresponding colors in the broadband visible light to pass through to the photosensors, but will block other colors of the broadband visible light. For instance, the red color filters will allow red light to pass through to the photosensors; the green color filters will allow green light to pass through to the photosensors; and the blue color filters will allow blue light to pass through to the photosensors. A photosensor beneath a given color filter will collect the signal of the light that the given color filter has allowed to pass through. Thus, the responses of the color filters in the integrated camera are similar to the responses of the sensors used in a typical colorimeter. In one example, the integrated camera of the mobile device 112 may be color calibrated prior to being used to perform any sort of calibration of the color display device 110.

In one example, the color display device 110 may be configured to host an application that communicates with an application hosted on the mobile device 112 to perform calibration of the color display device 110. For instance, the applications executing in the color display device 110 and the mobile device 112 may cooperate to establish a secure communication channel 114 between the color display device 110 and the mobile device 112. As an example, the application executing on the color display device 110 may cause the color display device 110 to display a machine readable code (e.g., a bar code, a quick response (QR) code, or the like). When the application executing on the mobile device 112 controls the integrated camera of the mobile device 112 to detect the machine readable code, detection of the machine readable code may trigger operations to establish the secure communication channel 114. The secure communication channel 114 may comprise a secure, near-field, wireless communication channel.

Once the secure communication channel 114 is established, the application executing on the color display device 110 may cause the color display device to display a plurality of test patterns. The plurality of test patterns may include a plurality of color samples having known color values (i.e., color values that are measured in a lab using a reference color measurement instrument). The plurality of test patterns may also include a plurality of fiducial markers to assist a user in positioning the mobile device 112 relative to the color display device for optimal color measurement.

Figure 2:
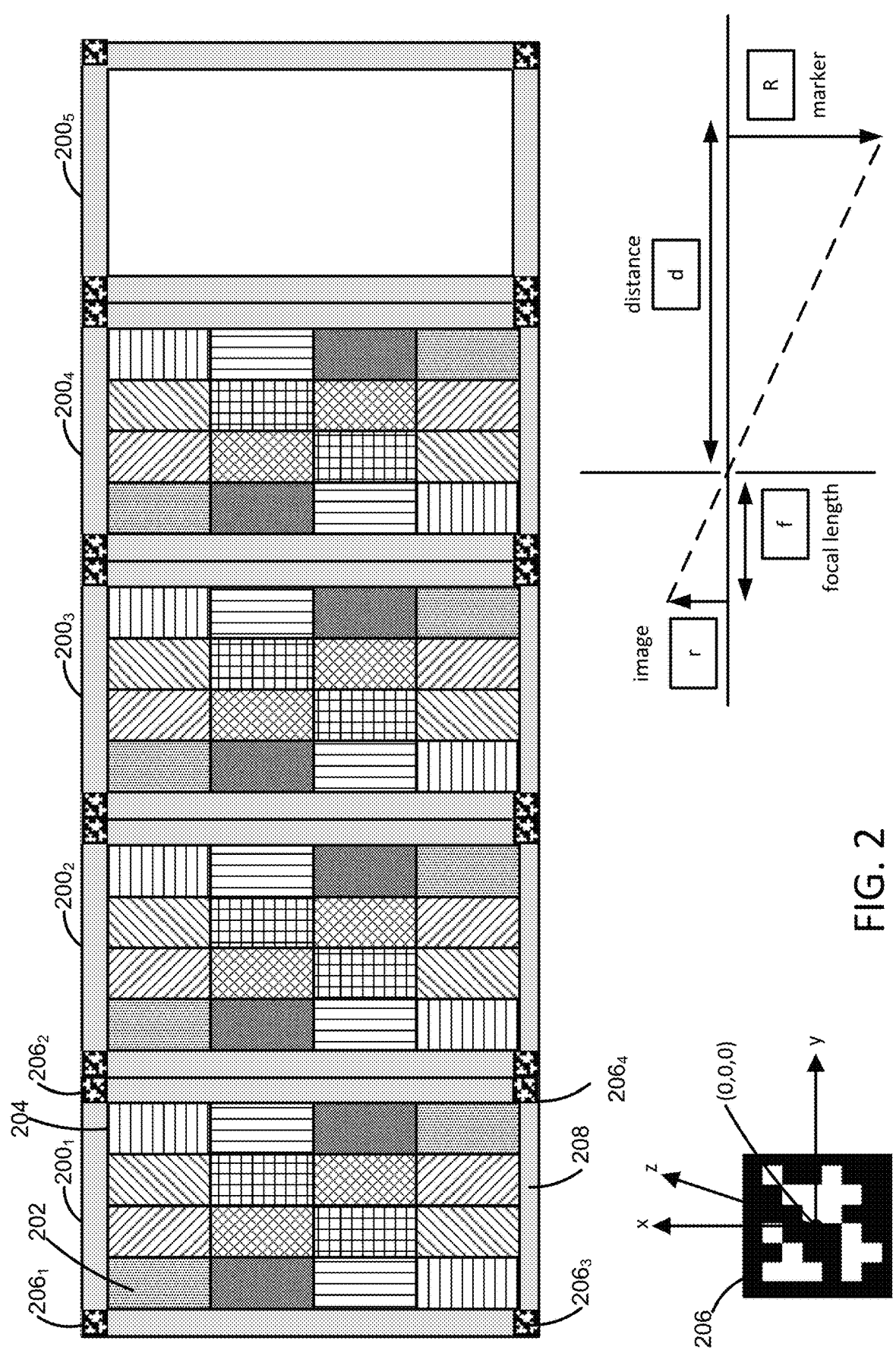
FIG. 2 illustrates an example plurality of test patterns.

FIG. 2, for instance, illustrates an example plurality of test patterns $200_1$-$200_5$ (hereinafter individually referred to as a "test pattern 200" or collectively referred to as "test patterns 200"). Although five test patterns are illustrated, it should be noted that any number of test patterns may be used without departing from the scope of the present disclosure.

As illustrated, each test pattern 200 may comprise a plurality of color samples, where the color samples comprise swatches of different shades of red, green, blue, grey, and white. One of these color samples is labeled as 202 in FIG. 2. In one example, all but one of the test patterns 200 (i.e., test patterns $200_1$-$200_4$ in FIG. 2) may each include sixteen color samples in different shades of red, green, blue, grey, and white, where the color samples are arranged in a matrix of rectangular swatches (such that the four test patterns collectively provide sixty-four color samples). The matrix of the test pattern $200_1$ is labeled as 204 in FIG. 2. Different shading is used in FIG. 2 to indicate different colors. In one example, the color samples contained in the same test pattern 200 may share a similar level of brightness, which reduces light bleeding from one color sample to another. A last test pattern (i.e., test pattern $200_5$ in FIG. 2) may comprise a uniform white test pattern (i.e., no red, green, blue, or grey shades). In each test pattern 200, a border area may surround the matrix of rectangular swatches on all four sides. The border area of the test pattern $200_1$ is labeled as 208 in FIG. 2. The border area may comprise an area of a solid neutral color (e.g., black, white, or neutral gray).

The color samples may be measured prior to use in a lab, using a reference color measurement instrument (e.g., a colorimeter or spectrophotometer). This establishes known or expected color values (e.g., CIELAb or XYZ values) for the color samples. The color samples may subsequently be measured in the lab using a mobile device of the same make and model as the mobile device 112. A matrix M may then be constructed that converts the raw color measurements made by the mobile device of the same make and model as the mobile device 112 to the known or expected measurements made by the reference color measurement instrument. The matrix M may be used later, as discussed in further detail below, to compute adjustments to the color settings of the color display device 110.

In a further example, each test pattern 200 may also include a plurality of fiducial markers (e.g., ArUco markers, or the like). The fiducial markers of the test pattern $200_1$ are labeled as $206_1$-$206_4$ in FIG. 2. The plurality of fiducial markers may be positioned in the border area of the test pattern 200 that surrounds the rectangular matrix of swatches. In one example, each test pattern 200 includes four fiducial markers (e.g., one fiducial marker near each corner of the rectangular matrix). However, in other examples, each test pattern may include a different number of fiducial markers. In one example, the sizes of the fiducial markers, as well as the size of the test pattern 200 as a whole, may be variable depending upon the dimensions (e.g., dots per inch, or DPI) of the display surface.

In practice, when a test pattern 200 is displayed on the display surface of the color display device 110 during calibration of the color display device 110, the fiducial markers help to guide a user in positioning the mobile device 112 for accurate measurement of the colors. For instance, when the secure communication channel 114 is established, the application executing on the color display device 110 will cause the color display device to display a test pattern 200. All of the test patterns 200 will ultimately be displayed, one at a time, by the color display device.

At the same time, the application executing on the mobile device 112 will cause an overlay of a semi-transparent grid to be displayed over a live image on the display surface of the mobile device 112. The semi-transparent grid may mimic the dimensions and layout of the test pattern 200 that is displayed on the display surface of the color display device 110, including the positions of the fiducial markers. When the mobile device 112 is held so that the display surface of the color display device 110 is visible in the live image, the user may adjust the position of the mobile device 112 until the semi-transparent grid is aligned or overlaps with the test pattern 200 that is displayed. For instance, when the fiducial markers in the semi-transparent grid are lined up with the fiducial markers of the test pattern 200, this may indicate that the mobile device 112 is positioned to accurately capture the colors of the test pattern 200 that are being output by the color display device 110.

Once the mobile device 112 is positioned to accurately capture the colors of the test pattern 200 that are being output by the color display device 110, the application executing on the mobile device 112 may cause an integrated camera of the mobile device to capture an image of the test pattern 200. This process of alignment and image capture may be repeated for each of the test patterns 200, one at a time. Once images of all of the test patterns 200 have been captured, the application executing on the mobile device 112 may process the images and compare red, green, and blue values of the images to the red, green, and blue values that the color display device 110 is expected to be outputting. The application executing on the mobile device 112 may compute an adjustment to the color settings of the color display device 110 based on this comparison. When the color display device 110 makes the adjustments, this may result in the color display device 110 outputting colors that are truer to the colors that the color display device 110 is expected to be outputting.

The design of the test patterns allows the mobile device to measure a plurality of (e.g., sixteen) colors on color display device 110 at one time, as opposed to measuring colors one at a time (as in conventional). Thus, even though a total of five test patterns 200 may be measured by the mobile device 112, the total amount of time required to measure all of the known colors contained in the five test patterns may be greatly reduced relative to conventional calibration techniques.

It should also be noted that the system 100 has been simplified. Thus, it should be noted that the system 100 may be implemented in a different form than that which is illustrated in FIG. 1 without departing from the scope of the present disclosure.

Figure 3:
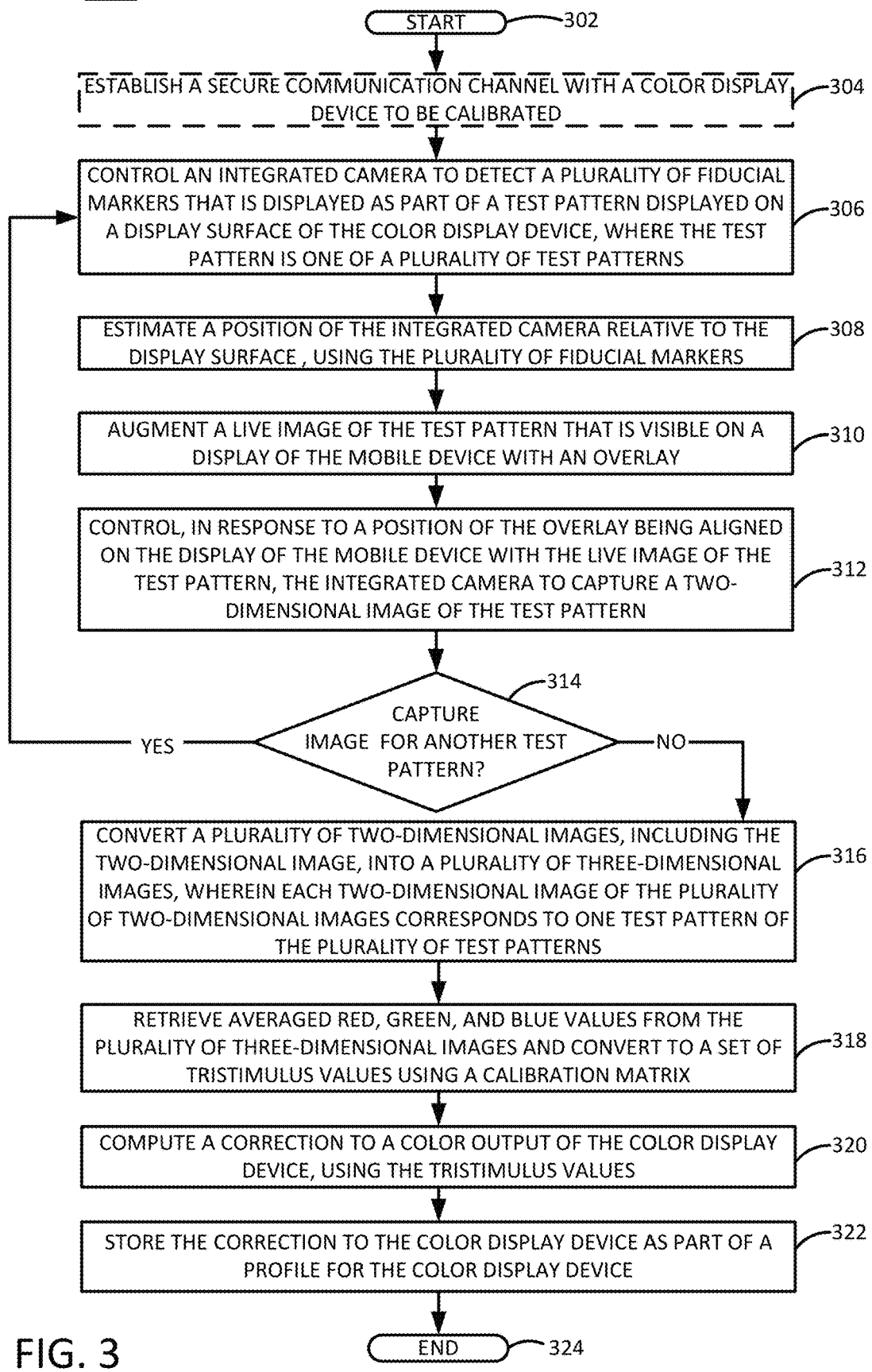
FIG. 3 is a flow chart illustrating one example of a method for calibrating of a color display device using a mobile device, according to the present disclosure.

FIG. 3 is a flow chart illustrating one example of a method 300 for calibrating of a color display device using a mobile device, according to the present disclosure. In one example, the method 300 may be performed, for instance, by the mobile device 112 of FIG. 1 and/or by another computing device that is communicatively coupled to the mobile device 112. In another example, the method 300 may be performed by a processor of a computing device, such as the processor 602 illustrated in FIG. 6. For the sake of example, the method 300 is described below as being performed by a processing system.

The method 300 begins in step 302. In optional step 304 (illustrated in phantom), the processing system may establish a secure communication channel with a color display device to be calibrated.

In one example, as discussed above, the processing system may be part of a mobile device that is being used to calibrate the color display device. For instance, the mobile device may comprise a smart phone or a tablet computer, while the color display device may comprise a television, a computing system including a monitor or display, the display of another smart phone or tablet computer, or the like.

In one example, establishing the secure communication channel may involve controlling an integrated camera of the mobile device to detect a machine readable code (e.g., a bar code, a QR code, or the like) that is displayed by the color display device. The machine readable code may contain a locator, identifier, or tracker that, when recognized by the processing system, enables the processing system to establish the secure communication channel (e.g., via a WebSockets application programming interface (API)) with an application executing on the color display device. In a further example, recognition of the locator, identifier, or tracker in the machine readable code also automatically initiates the calibration process that begins in step 306.

In step 306, the processing system may control an integrated camera to detect a plurality of fiducial markers that is displayed as part of a test pattern displayed on a display surface of the color display device, wherein the test pattern is one of a plurality of test patterns.

In one example, the integrated camera comprises a built-in camera that is part of the mobile device of which the processing system is a part. That is, the camera is a fixed part of the mobile device, as opposed to being part of some external system that can be attached to and detached from the mobile device as needed.

In one example, in response to the establishment of the secure communication channel, the color display device may display a test pattern, such as the test pattern 200 illustrated in FIG. 2 and discussed above. The test pattern may be one of a plurality of test patterns that the color display device displays in sequence, as discussed in further detail below. In one example, the test pattern may comprise a plurality of color samples, where the color samples comprise swatches of different shades of red, green, blue, and white. For instance, the plurality of test patterns may comprise four test patterns that each include sixteen color samples in different shades of red, green, blue, and white, where the color samples are arranged in a matrix of rectangular swatches (such that the four test patterns collectively provide sixty-four color samples). A fifth test pattern may comprise a uniform white test pattern (i.e., no red, green, or blue shades).

In a further example, each test pattern may include a plurality of fiducial markers (e.g., ArUco markers, or the like). The plurality of fiducial markers may be positioned in a border area that surrounds the rectangular matrix of swatches. In one example, each test pattern includes four fiducial markers (e.g., one fiducial marker near each corner of the rectangular matrix). In one example, the sizes of the fiducial markers, as well as the size of the test pattern as a whole, may be variable depending upon the dimensions (e.g., dots per inch, or DPI) of the display surface.

In step 308, the processing system may estimate a position of the integrated camera relative to the display surface, using the plurality of fiducial markers.

For instance, the plurality of fiducial markers (individually or in combination) detected in the test pattern may be unique to that test pattern. Furthermore, local or remote storage (e.g., local memory of the mobile device, a remote database, or the like) may store information that can identify a specific test pattern being displayed, based on the fiducial markers that are detected and the locations of the fiducial markers relative to each other. The stored information may also include information about the dimensions or sizes of the fiducial markers. The stored information, in combination with the currently detected information about the fiducial markers, may allow the pose of the integrated camera (i.e., the position and orientation of the integrated camera in a world coordinate system, with respect to six degrees of freedom) relative to each of the fiducial markers to be determined.

In one example, the pose of the integrated camera with respect to a given fiducial marker is represented by the three-dimensional transformation from the coordinate system of the fiducial marker (e.g., a virtual coordinate system having (0,0,0) in the center of the fiducial marker, with the z axis pointing out as shown in FIG. 2) to the coordinate system of the integrated camera.

The three-dimensional transformation may be specified by a rotation and a translation vector. The processing system may know, prior to detecting the fiducial markers: (1) the intrinsic parameters of the integrated camera (e.g., a transformation matrix that converts points from the coordinate system of the integrated camera to the pixel coordinate system; the parameters may include focal length, image sensor format, and camera principal point); and (2) the physical size(s) of the fiducial markers that are detected. If both (1) and (2) are known, then the real-world pose of each fiducial marker with respect to the integrated camera can be estimated, since the pinhole (monocular) camera generates a one-to-one relationship between the image and the object depicted in the image. The relationship between the unknown parameter of distance (d) from the integrated camera to the fiducial marker and the known parameters of integrated camera focal length (f), size (r) of the marker in the image plane, and the size (R) of the marker in the object plane may thus be estimated as shown in FIG. 2 using the principle of similar triangles as follows:

$$\frac{f}{d} = \frac{r}{R} \quad \text{(EQN. 1)}$$

where $$f = d \times \frac{r}{R} \text{ pixels} \quad \text{(EQN. 2)}$$

and $$d = f \times \frac{R}{r} \text{ centimeters} \quad \text{(EQN. 3)}$$

Anomalies in the readings may be filtered out, and the results across the last n image frames (e.g., n=5) may be averaged.

In step 310, the processing system may augment a live image of the test pattern that is visible on a display of the mobile device with an overlay.

Figure 4:
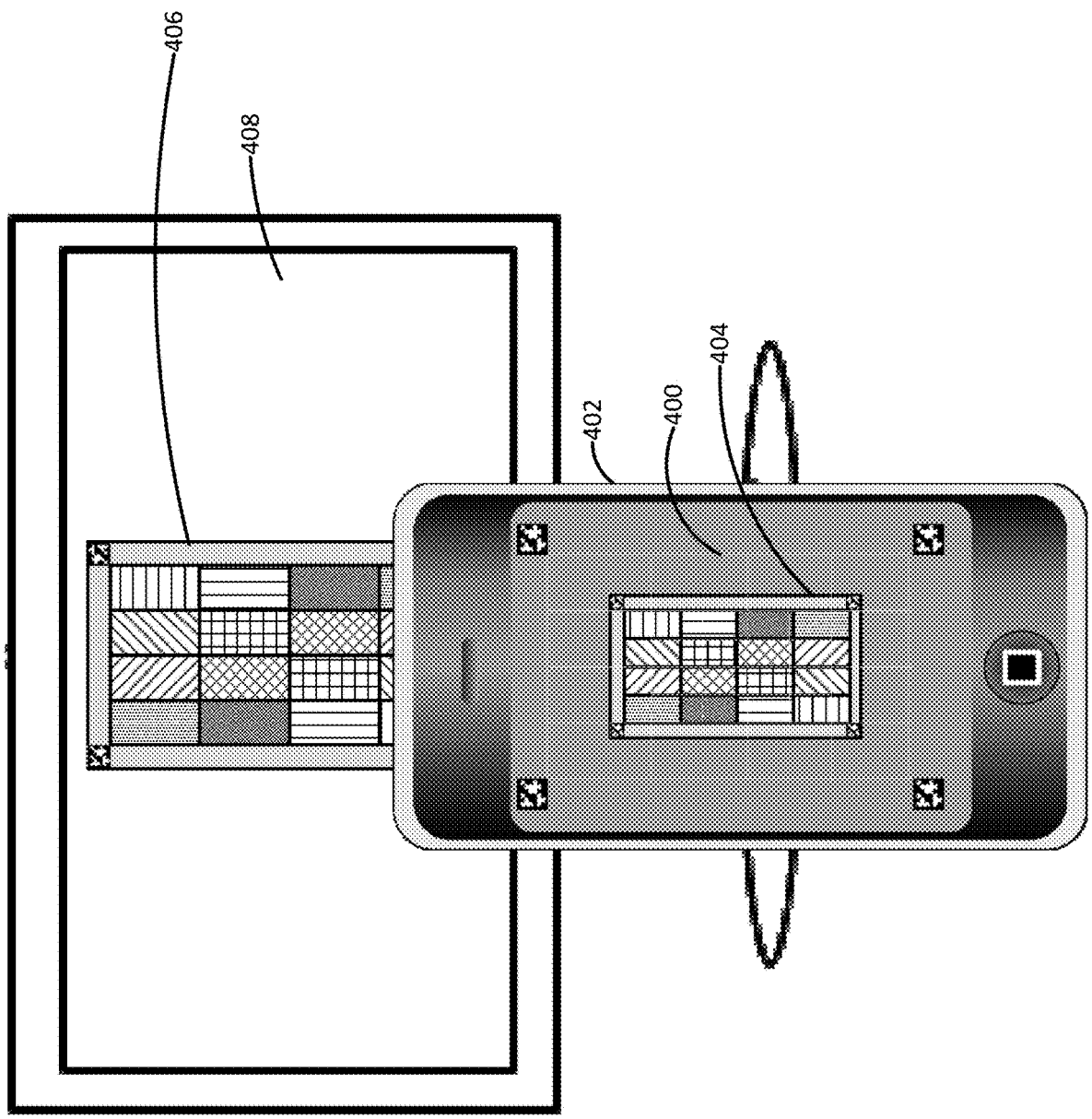
FIG. 4 illustrates an example overlay that is displayed on the display of a mobile phone.

In one example, the overlay comprises a semi-transparent grid having dimensions similar to the dimensions of the test pattern. FIG. 4, for instance, illustrates an example overlay 400 that is displayed on the display of a mobile phone 402. The processing system may instruct a user of the mobile device (i.e., mobile phone 402 in the example of FIG. 4) to adjust a position of the mobile device until the grid shown in the overlay 400 is aligned (e.g., overlaps) with the rectangular matrix of the "live image" 404 of the test pattern 406. Knowing the estimated positions of the fiducial markers allows the processing system to size the grid on the display of the mobile phone 402 so that the guided overlap occurs at the optimal distance and angle from the color display device's display surface 408 to allow for accurate color measurement of the test pattern 406.

When the grid shown in the overlay 400 is aligned with the rectangular matrix of the live image 404 of the test pattern 406 (within a degree of tolerance to account for the fact that the hands holding the mobile phone 402 may not be perfectly steady), this indicates that the mobile device (i.e., the mobile phone 402 in the case of FIG. 4) is positioned for accurate measurement of the test pattern 406.

Returning to FIG. 3, in step 312, the processing system may control, in response to a position of the overlay being aligned on the display of the mobile device with the live image of the test pattern, the integrated camera to capture a two-dimensional image of the test pattern.

For instance, the processing system may track the positions of the fiducial markers in the overlay while the user adjusts the position of the mobile device. The processing system may detect when the fiducial markers in the overlay are aligned with the fiducial markers in the test pattern, and this detection may automatically trigger an image capture in one example. In a further example, the processing system may cause an alert to be displayed on the display of the mobile device, where the alert indicates to the user that image capture is about to occur and that the user should hold the mobile device still (e.g., not continue to adjust the position of the mobile device). In another example, the alert may additionally or alternatively include a non-visual alert, such as an audible alert (e.g., a chime or beep) or a haptic alert (e.g., a vibration).

In one example, the two-dimensional image may comprise a raw digital negative (DNG) image, i.e., a two-dimensional image that contains the exact raw counts from each pixel of the integrated camera's sensor. Every pixel on the camera sensor will not necessarily have the same wavelength responsivity. For instance, a first subset (e.g., one quarter) of the pixels may only respond to red light, a second subset (e.g., one quarter) of the pixels may only respond to blue light, and a third subset (e.g., one half) of the pixels may only respond to green light.

In one example, before the integrated camera is controlled to capture the two-dimensional image, the processing system may control the integrated camera to temporarily allow the image on the display of the mobile device to go out of focus. This temporary lack of focus may help to counter the Moire Pattern problem, which is an interference pattern that may appear in a captured image due to the refresh rates of the integrated camera and the color display device being out of sync (which may cause the image to be captured in the middle of the color display device's refreshing process and produce unwanted visual artifacts and image distortions).

In step 314, the processing system may determine whether two-dimensional images need to be captured for additional test patterns of the plurality of test patterns.

For instance, as discussed above, the test pattern may be one of a plurality of (e.g., five) different test patterns used to calibrate the color display device. These test patterns may be displayed on the display surface of the color display device one by one, and two-dimensional images of each of the test patterns may be captured according to steps 306-312. Thus, if at step 314 images of fewer than all of the plurality of test patterns have been captured, this may indicate that two-dimensional images still need to be captured for any remaining test patterns.

If the processing system concludes in step 314 that two-dimensional images do need to be captured for additional test patterns of the plurality of test patterns, then the method 300 may return to step 306, and the processing system may automatically repeat steps 306-312 for a next test pattern of the plurality of test patterns. In one example, the settings of the integrated camera remain constant at least until two-dimensional images for all of the test patterns of the plurality of test patterns have been captured (i.e., for each iteration of steps 306-312 for the color display device being calibrated).

If, however, the processing system concludes in step 314 that two-dimensional images do not need to be captured for additional test patterns of the plurality if test patterns, then the method 300 may proceed to step 316. Step 316 may begin a process of calibrating the color display device (e.g., computing adjustments to one or more color settings of the color display device) based on the information extracted from the two-dimensional image.

In step 316, the processing system may convert a plurality of two-dimensional images, including the two-dimensional image, into a plurality of three-dimensional images, wherein each two-dimensional image of the plurality of two-dimensional images corresponds to one test pattern of the plurality of test patterns.

As discussed above, a two-dimensional image may be captured (e.g., according to steps 306-312) for each test pattern of the plurality of test patterns. The two-dimensional images may be raw DNG images, where each raw DNG image includes a plurality of points (e.g., represented by the fiducial markers in the corresponding test pattern) indicating the edges or corners of the corresponding test pattern's color samples. This allows for the extraction of data for the individual color samples from the rectangular matrix of each test pattern.

In one example, the pixels of the integrated camera's sensor with the red, green, and blue wavelength responsivity may be arranged in what is known as a "Bayer pattern." Different camera sensors may have different Bayer pattern arrangements, and the specific Bayern pattern arrangement of the sensor of the integrated camera may be read from the DNG metadata. Image processing techniques, such as demosaicing, may be used to retrieve color values (e.g., red, green, and blue) from each pixel of the sensor. After this image processing, the two-dimensional Bayer images may be converted into three-dimensional color images.

In one example, before converting the two-dimensional Bayer images into three-dimensional color images, all but one of the two-dimensional images may be normalized by the remaining two-dimensional image. For instance, as discussed above, the plurality of test patterns may comprise four test patterns containing rectangular matrices of color samples and one test pattern containing a uniform white sample. In this case, the two-dimensional (e.g., raw DNG) image for the uniform white sample may be used to normalize the two-dimensional (e.g., raw DNG) images of the other color samples to compensate for camera non-uniformities.

Typically, the metadata of DNG images contains some spatial vignetting parameters that can be used to correct camera non-uniformities. However, the stored vignetting parameters were created for far-field image capture rather than images that are captured from only a few inches away from the subject. Thus, a custom non-uniformity correction may be necessary.

In step 318, the processing system may retrieve averaged red, green, and blue values from the plurality of three-dimensional images and convert the averaged red, green, and blue values to tristimulus (XYZ) values using a calibration matrix of the mobile device.

In one example, the averaged red, green, and blue values are retrieved from each color sample of each test pattern for which a three-dimensional image has been generated. Thus, if the plurality of test patterns included four test patterns that each further included sixteen color samples, for a total of sixty-four color samples, then the averaged red, green, and blue values would be retrieved for each color sample of the sixty-four color samples.

In one example, averaged red, green, and blue values for a given color sample may be retrieved by first cropping an area that is equal to approximately one half of the total area of the given color sample from the three-dimensional image. The cropped area may be cropped from approximately a middle of the color sample. The red, green, and blue values from each pixel in the image captured in step 312 within the cropped area may then be averaged and converted to XYZ values (e.g., as defined by the Commission Internationale de l'Eclairage or CIE) using the calibration matrix of the mobile device. The calibration matrix is created for the make and model of the mobile device (e.g., prior to the test patterns being deployed for use, as discussed above).

In step 320, the processing system may compute a correction to a color output of the color display device, using the tristimulus values.

In one example, computing the correction may involve converting the XYZ tristimulus values into xyY values according to known standard calculations. In the XYZ color space, Y represents the brightness of a given color; in the xyY color space, the xy values may represent the chromaticity of the given color, while the Y values may represent the intensity or brightness of the given color. In one example, the xyY color values may be obtained according to:

$$\begin{bmatrix} X \\ Y \\ Z \end{bmatrix} = M \begin{bmatrix} R \\ G \\ B \end{bmatrix}; \begin{bmatrix} x \\ y \\ Y \end{bmatrix} = \begin{bmatrix} \frac{x}{X+Y+Z} \\ \frac{y}{X+Y+Z} \\ Y \end{bmatrix} \quad \text{(EQN. 4)}$$

where M represents the calibration matrix for the make and model of the mobile device.

If each test pattern includes sixteen color samples, then sixteen sets of averaged red, green, and blue values (forty-eight individual values) may be retrieved from each three-dimensional image. For a set of four such test patterns, sixty-four sets of averaged red, green, and blue values (192 individual values) may be retrieved from the plurality of three-dimensional images. The sixty-four sets of averaged red, green, and blue values may be converted into sixty-four sets of XYZ tristimulus values, and then into sixty-four sets of xyY values.

In one example, the xyY values may be compared to expected or known xyY values for the color samples. The difference between the converted xyY values and the expected xyY values may comprise the correction that needs to be made to the color output of the color display device.

In step 322, the processing system may store the correction as part of a profile for the color display device. In one example, the correction may be stored on a computing device connected to the color display device (e.g., the memory of a separate desktop tower connected to an external monitor, the memory of a laptop or tablet computer, or the like).

The profile may comprise, for example, an ICC profile for the color display device. The ICC profile may specify adjustments to be made to the color output of the color display device wherein the adjustments are determined based on the corrections calculated in step 320. In one example, an adjustment, when made by the color display device, may result in a color being displayed on the display surface of the color display device more closely matching (e.g., matching within some predefined tolerance) the expected or known color of a corresponding color sample in the plurality of test patterns. In other words, the adjustment deploys the correction on the color display device. By storing the profile on a computing device connected to the color display device, the color display device may continue to apply any necessary color adjustments going forward, without the assistance of the mobile device.

The method 300 may end in step 324.

Figure 5:
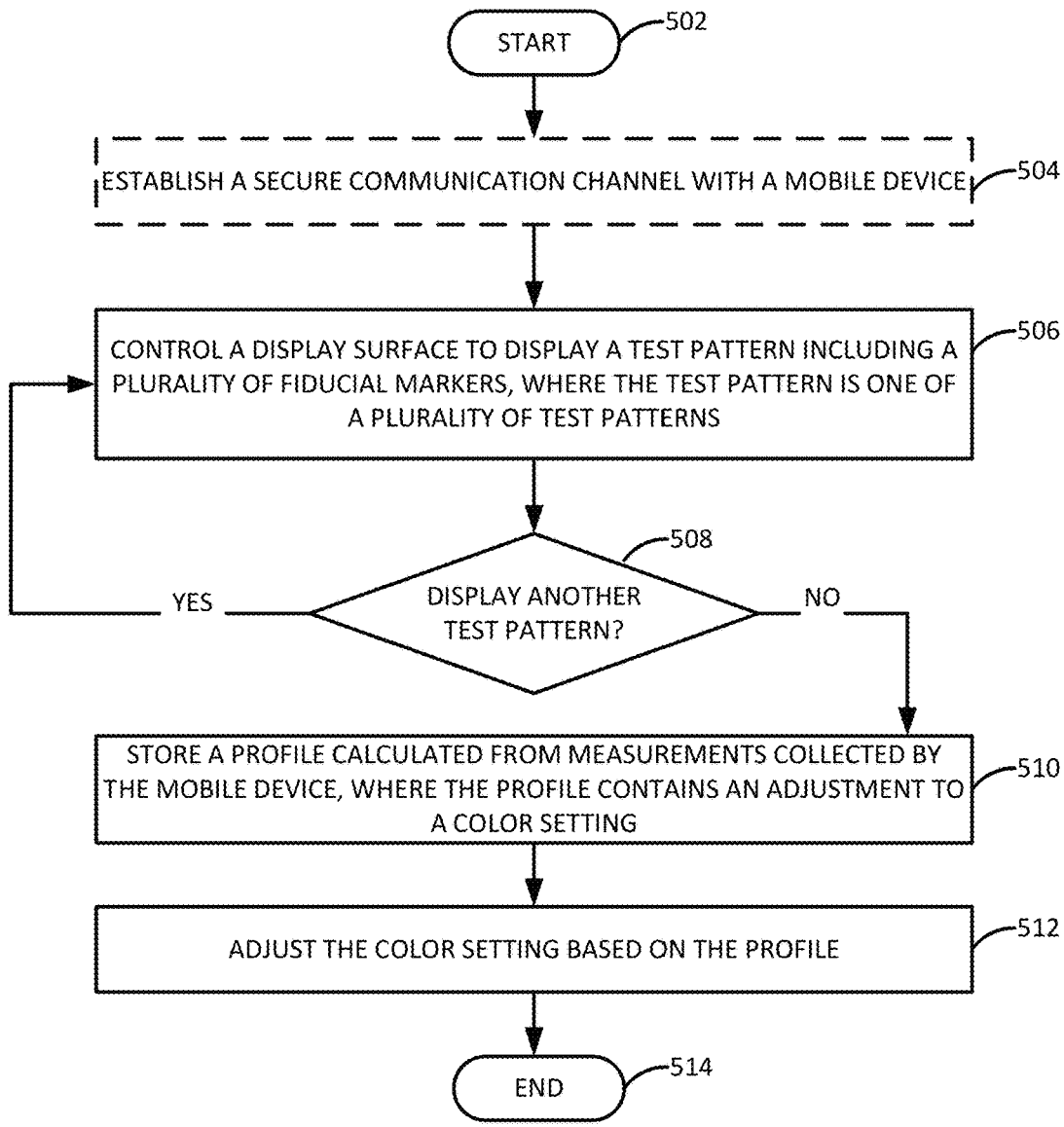
FIG. 5 is a flow chart illustrating one example of a method for calibrating of a color display device using a mobile device, according to the present disclosure.

FIG. 5 is a flow chart illustrating another example of a method 500 for calibrating of a color display device using a mobile device, according to the present disclosure. In one example, the method 500 may be performed, for instance, by a processing system of the color display device 110 of FIG. 1. In another example, the method 500 may be performed by a processor of a computing device, such as the processor 602 illustrated in FIG. 6. For the sake of example, the method 500 is described below as being performed by a processing system.

The method 500 begins in step 502. In optional step 504 (illustrated in phantom), the processing system may establish a secure communication channel with a mobile device.

In one example, as discussed above, the processing system may be part of a color display device that is being calibrated in part by a mobile device. For instance, the mobile device may comprise a smart phone or a tablet computer, while the color display device may comprise a television, a computing system including a monitor or display, the display of another smart phone or tablet computer, or the like.

In one example, establishing the secure communication channel may involve controlling a display surface of the color display device to display a machine readable code (e.g., a bar code, a QR code, or the like). The machine readable code may contain a locator, identifier, or tracker that, when imaged and recognized by the mobile device, enables the mobile device to establish the secure communication channel (e.g., via a WebSockets application programming interface (API)) with an application executing on the mobile device.

In step 506, the processing system may control a display surface (e.g., of the color display device of which the processing system is a part) to display a test pattern including a plurality of fiducial markers, wherein the test pattern is one of a plurality of test patterns.

In one example, in response to the establishment of the secure communication channel, the processing system may control the color display device to display a test pattern, such as the test pattern 200 illustrated in FIG. 2 and discussed above. The test pattern may be one of a plurality of test patterns that the color display device is controlled to display in sequence, as discussed in further detail below. In one example, the test pattern may comprise a plurality of color samples, where the color samples comprise swatches of different shades of red, green, blue, and white. For instance, the plurality of test patterns may comprise four test patterns that each include sixteen color samples in different shades of red, green, blue, and white, where the color samples are arranged in a matrix of rectangular swatches (such that the four test patterns collectively provide sixty-four color samples). A fifth test pattern may comprise a uniform white test pattern (i.e., no red, green, or blue shades).

In a further example, each test pattern may include a plurality of fiducial markers (e.g., ArUco markers, or the like). The plurality of fiducial markers may be positioned in a border area that surrounds the rectangular matrix of swatches. In one example, each test pattern includes four fiducial markers (e.g., one fiducial marker near each corner of the rectangular matrix). In one example, the sizes of the fiducial markers, as well as the size of the test pattern as a whole, may be variable depending upon the dimensions (e.g., dots per inch, or DPI) of the display surface. As discussed above, the fiducial markers help a user of the mobile device to position the mobile device for accurate capture of the colors in the test pattern.

In step 508, the processing system may determine whether the color display device should be controlled to display additional test patterns of the plurality of test patterns.

For instance, as discussed above, the test pattern may be one of a plurality of (e.g., five) different test patterns used to calibrate the color display device. These test patterns may be displayed on the display surface of the color display device one by one, and the mobile device may capture two-dimensional images of each of the test patterns. Thus, if at step 508 fewer than all of the plurality of test patterns have been displayed by the color display device, this may indicate that the color display device should still be controlled to display any remaining test patterns.

If the processing system concludes in step 508 that the color display device should be controlled to display additional test patterns of the plurality of test patterns, then the method 500 may return to step 506, and the processing system may repeat step 506 for a next test pattern of the plurality of test patterns.

If, however, the processing system concludes in step 508 that the color display device should not be controlled to display additional test patterns of the plurality of test patterns, then the method 500 may proceed to step 510.

In step 510, the processing system may store a profile calculated from measurements collected by the mobile device, wherein the profile contains an adjustment to a color setting (e.g., a color setting of the color display device).

For instance, as discussed above, the color samples in the test pattern may have known colors. The processing system may compare the colors that were actually displayed by the color display device in step 506 to the known colors, and compute an adjustment as part of an ICC profile that will result in the colors actually displayed by the color display device being closer to the known colors.

In step 512, the processing system may adjust the color setting based on the profile. By adjusting the color setting, the colors actually displayed by the color display device may be closer to the known colors of the color samples.

In step 514, the method 500 may end.

It should be noted that the method 300 or 500 may be expanded to include additional steps or may be modified to include additional operations with respect to the steps outlined above. In addition, although not specifically specified, one or more steps, functions, or operations of the method 300 or 500 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 3 or 5 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Moreover, although FIGS. 3 and 5 describe a process for calibrating a single color display device, in other examples, the same methods may be utilized to calibrate multiple color display devices that are coupled to a common processing system (e.g., a computer including multiple monitors, a video wall, or the like). In one example, the multiple color displays may be calibrated sequentially. For instance, when the machine readable code is displayed to pair the mobile device to the color display devices, each color display device may display a different machine readable code that includes a unique identifier for that particular color display device. When the mobile device interacts with the machine readable code on a first color display device, this will cause the plurality of test patterns to be displayed sequentially on the first color display device. Once all of the test patterns have been imaged on the first color display device, the mobile device may interact with the machine readable code on a next color display device and repeat the process for the next color display device. This may continue until the test patterns have been imaged on all of the color display devices. The calibration data for each color display device may be tracked separately, however, and each color display device may receive a unique color correction (adjustment) without having to restart the application.

FIG. 6 is a high level block diagram of the calibration method that is implemented using a computing device 600 specifically programmed to perform the functions described herein. In one example, a computing device 600 comprises a processor 602, a memory 604, a calibration module 605 and various input/output (I/O) devices 606 such as a display, a keyboard, a mouse, a modem, a network connection and the like. In one example, at least one I/O device is a storage device (e.g., a disk drive, an optical disk drive, a floppy disk drive). It should be understood that the calibration module 605 can be implemented as a physical device or subsystem that is coupled to a processor through a communication channel.

Alternatively, the calibration module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the computing device 600. Additionally, the software may run in a distributed or partitioned fashion on two or more computing devices similar to the computing device 600. Thus, in one example, the calibration module 605 for calibrating a color display device using a mobile device described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various examples which incorporate the teachings of the present disclosure have been shown and described in detail herein, those skilled in the art can readily devise many other varied examples that still incorporate these teachings.

What is claimed is:

1. A method comprising:
controlling, by a processing system of a mobile device, an integrated camera of the mobile device to detect a plurality of fiducial markers that is displayed as part of a test pattern displayed on a display surface of a color display device to be calibrated, wherein the test pattern is one of a plurality of test patterns;
estimating, by the processing system, a position of the integrated camera relative to the display surface, using the plurality of fiducial markers;
augmenting, by the processing system, a live image of the test pattern that is visible on a display of the mobile device with an overlay;
controlling, by the processing system in response to a position of the overlay being aligned on the display of the mobile device with the live image of the test pattern, the integrated camera to capture a two-dimensional image of the test pattern; and calculating, by the processing system, an adjustment to a color setting of the color display device, wherein the adjustment is calculated based on information extracted from the two-dimensional image.

2. The method of claim 1, wherein each test pattern of the plurality of test patterns comprises a sample area surrounded by a solid colored border area.

3. The method of claim 2, wherein the plurality of fiducial markers comprises four fiducial markers, and each fiducial marker of the four fiducial markers is positioned in one corner of the solid colored border area.

4. The method of claim 3, wherein for all but one test pattern of the plurality of test patterns, the sample area contains a respective plurality of color samples of known colors arranged in a matrix of rectangular swatches.

5. The method of claim 4, wherein each respective plurality of color samples contains different shades of red, green, blue, and grey.

6. The method of claim 4, wherein for a remaining one test pattern of the plurality of test patterns, the sample area contains a uniform white sample.

7. The method of claim 3, wherein the plurality of fiducial markers comprises a plurality of ArUco markers.

8. The method of claim 1, wherein the overlay comprises a semi-transparent grid that mimics dimensions and a layout of the test pattern, including positions of the plurality of fiducial markers.

9. The method of claim 8, wherein the overlay is detected as being aligned on the display of the mobile device with the live image of the test pattern when the positions of the plurality of the fiducial markers in the overlay match positions of the plurality of fiducial markers in the live image of the test pattern.

10. The method of claim 9, wherein the controlling the integrated camera to capture the two-dimensional image is automatically triggered in response to the positions of the plurality of the fiducial markers in the overlay being detected to match the positions of the plurality of fiducial markers in the live image of the test pattern.

11. The method of claim 1, further comprising:
establishing, by the processing system prior to the controlling the integrated camera of the mobile device to detect the plurality of fiducial markers, a secure communication channel with the color display device.

12. The method of claim 11, wherein the establishing comprises controlling the integrated camera of the mobile device to detect a machine readable code that is displayed by the color display device, wherein the machine readable code contains an identifier that, when recognized by the processing system, enables the processing system to establish the secure communication channel with an application executing on the color display device.

13. The method of claim 1, wherein the calculating comprises:
converting, by the processing system, a plurality of two-dimensional images, including the two-dimensional image, into a plurality of three-dimensional images, wherein each two-dimensional image of the plurality of two-dimensional images corresponds to one test pattern of the plurality of test patterns;
retrieving, by the processing system, averaged red, green, and blue values from the plurality of three-dimensional images; and
converting the averaged red, green, and blue values to a set of tristimulus values, wherein the adjustment is calculated based on the tristimulus values.

14. The method of claim 1, further comprising:
storing, by the processing system, the adjustment to a computing device connected to the color display device as a profile for the color display device.

15. The method of claim 14, wherein the profile comprises an International Color Consortium color profile.

16. The method of claim 1, wherein the color display device comprises at least one of: a television, a computing system including a monitor, a tablet computer, a mobile phone, a laptop computer, a virtual reality headset, or a gaming device.

17. The method of claim 16, wherein the mobile device comprises one of: a mobile phone or a tablet computer.

18. The method of claim 17, wherein the integrated camera is a built-in camera having components that reside on a motherboard of the at least one of: the mobile phone or the tablet computer.

19. A non-transitory computer-readable medium storing instructions which, when executed by a processing system of a mobile device, cause the processing system to perform operations, the operations comprising:
controlling an integrated camera of the mobile device to detect a plurality of fiducial markers that is displayed as part of a test pattern displayed on a display surface of a color display device to be calibrated, wherein the test pattern is one of a plurality of test patterns;
estimating a position of the integrated camera relative to the display surface, using the plurality of fiducial markers;
augmenting a live image of the test pattern that is visible on a display of the mobile device with an overlay;
controlling, in response to a position of the overlay being aligned on the display of the mobile device with the live image of the test pattern, the integrated camera to capture a two-dimensional image of the test pattern; and
calculating an adjustment to a color setting of the color display device, wherein the adjustment is calculated based on information extracted from the two-dimensional image.

20. A mobile device comprising:
a processing system including at least one processor; and
a non-transitory computer-readable medium storing instructions which, when executed by the processing system, cause the processing system to perform operations, the operations comprising:
controlling an integrated camera of the mobile device to detect a plurality of fiducial markers that is displayed as part of a test pattern displayed on a display surface of a color display device to be calibrated, wherein the test pattern is one of a plurality of test patterns;
estimating a position of the integrated camera relative to the display surface, using the plurality of fiducial markers;
augmenting a live image of the test pattern that is visible on a display of the mobile device with an overlay;
controlling, in response to a position of the overlay being aligned on the display of the mobile device with the live image of the test pattern, the integrated camera to capture a two-dimensional image of the test pattern; and
calculating an adjustment to a color setting of the color display device, wherein the adjustment is calculated based on information extracted from the two-dimensional image.

* * * * *